(12) United States Patent
Chen et al.

(10) Patent No.: US 10,021,313 B1
(45) Date of Patent: Jul. 10, 2018

(54) IMAGE ADJUSTMENT TECHNIQUES FOR MULTIPLE-FRAME IMAGES

(71) Applicant: Motorola Mobility LLC, Chicago, IL (US)

(72) Inventors: YinHu Chen, Deerfield, IL (US); Dejan Depalov, Mount Prospect, IL (US); Peter A. Matsimanis, Glenview, IL (US); Valeriy Marchevsky, Glenview, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days.

(21) Appl. No.: 15/445,867

(22) Filed: Feb. 28, 2017

(51) Int. Cl.
*H04N 9/73* (2006.01)
*H04N 5/235* (2006.01)
*H04N 5/265* (2006.01)
*H04N 7/01* (2006.01)
*G06T 5/00* (2006.01)

(52) U.S. Cl.
CPC ........... *H04N 5/2352* (2013.01); *G06T 5/003* (2013.01); *H04N 5/265* (2013.01); *H04N 7/0127* (2013.01)

(58) Field of Classification Search
CPC .... H04N 5/2352; H04N 7/0127; H04N 5/265; G06T 5/003
USPC ............................................ 348/223.1–227.1
See application file for complete search history.

(56) References Cited

U.S. PATENT DOCUMENTS

| | | | |
|---|---|---|---|
| 2012/0026317 A1* | 2/2012 | Nakahira | H04N 7/183 348/92 |
| 2016/0057347 A1* | 2/2016 | Gleason | G03B 13/36 348/220.1 |

* cited by examiner

*Primary Examiner* — Yogesh Aggarwal

(57) ABSTRACT

Various implementations provide different image adjustment parameters for post-processing a multi-frame image generated from multiple individual images. A computing device includes an image sensor that is configured to capture and generate multiple images of a scene. The multiple images are then aligned and pixel values of the aligned images are combined to generate a multi-frame image with reduced image noise and improved image sharpness in comparison to each of the multiple images. The computing device then applies different adjustment parameters to the multi-frame image in order to generate an output image that provides a high-quality representation of the scene. In implementations, the computing device automatically selects and applies adjustment parameters to a multi-frame image based on a number of individual images used to create the multi-frame image.

20 Claims, 7 Drawing Sheets

IMAGE ADJUSTMENT TECHNIQUES FOR MULTIPLE-FRAME IMAGES

BACKGROUND

A primary obstacle capturing high-quality images is the lack of light. In low-light situations, such as capturing images in indoor environments or at night, the scene as a whole may provide insufficient light. Images of outdoor daylight scenes may also suffer from insufficient light in shady areas of the scene. Although there are various accessories that can be used to gather more light, such as a larger-aperture lens, additional image sensors, image stabilization equipment, flash equipment, and so on, imaging devices with smaller form factors are unable to accommodate this equipment. For example, if the image capture device is a cell phone or wearable device, size constraints preclude inclusion of these large accessories.

Alternate strategies to improving image quality in low-light situations include increasing the exposure time of a camera or image sensor to increase pixel brightness. However, longer exposure times increase the presence of motion blur in an image that results from camera jitter or motion of a subject in the scene during image capture. In order to account for dark and noisy images, various techniques combine multiple image frames of a scene to produce a single image using pixel values from the multiple image frames. Combining multiple image frames into a single image reduces an overall amount of image noise, but it does not entirely eliminate image noise and often results in a visually soft image. Although there are various post-processing techniques that can be applied to improve visual qualities of a multiple-frame image, these post-processing techniques do not account for variations in a number of frames used to generate a multiple-frame image. Thus, it is desirable to visually alter images generated from multiple frames to produce a sharp image with minimal noise in a manner that considers an amount of frames used to generate an image.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
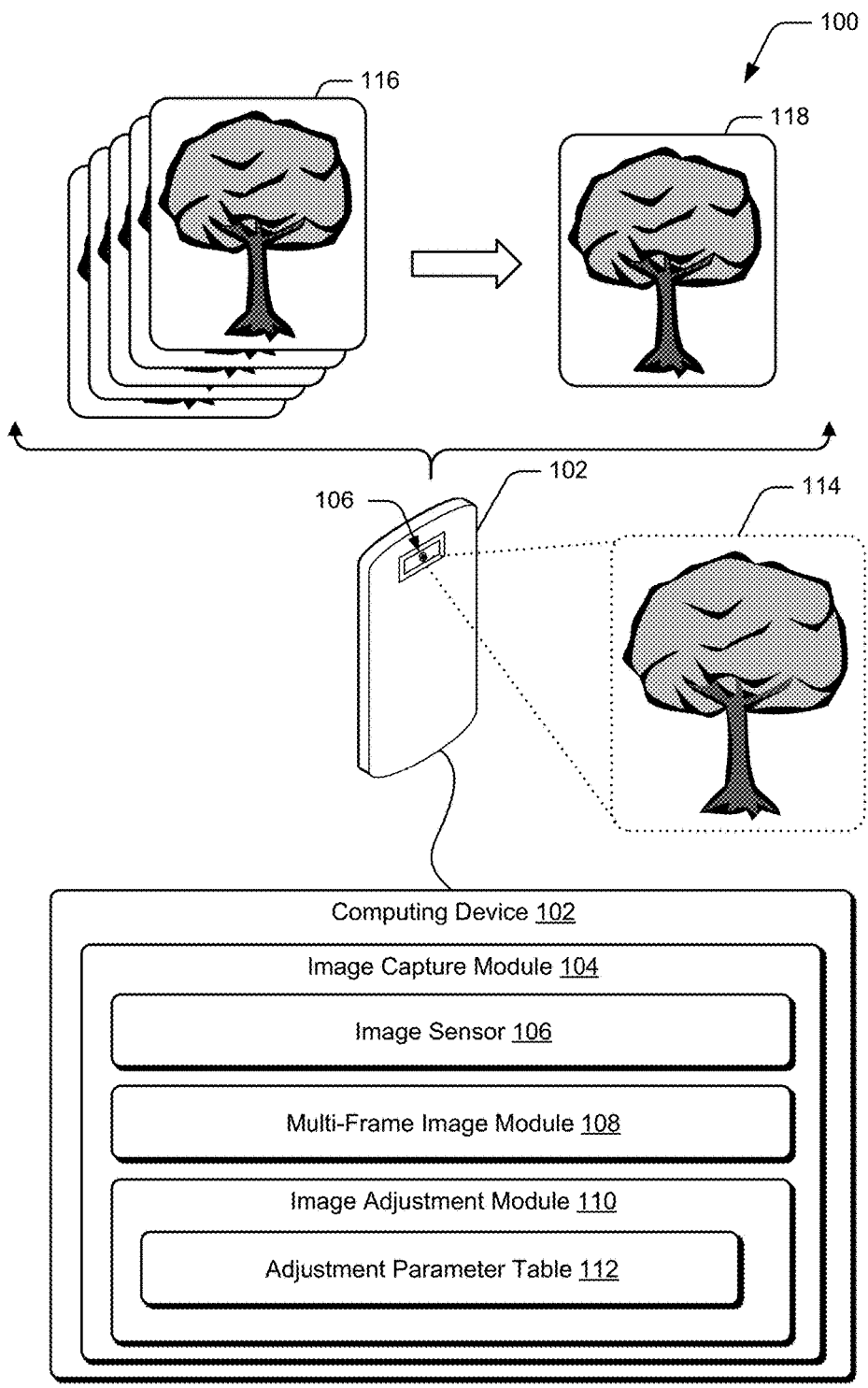
FIG. 1 is an overview of a representative environment that includes an example implementation in accordance with one or more embodiments.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Various implementations determine an amount of individual frames used to generate a multiple-frame image and dynamically adjust an appearance of the multi-frame image based on the determined amount of individual frames. A computing device includes an image sensor for capturing multiple image frames of a scene. In some implementations, a rate at which the image sensor captures individual frames depends on an amount of detectable light in the scene. The computing device then generates a multi-frame image from the individual frames by aligning the individual frames and combining pixel values from each of the aligned frames into a single frame. The computing device then enhances a visual appearance of the multi-frame image by applying one or more adjustment parameters to the multi-frame image in order to produce an output image. In implementations, different image adjustment parameters can be organized and grouped based on a number of individual frames used to generate the multi-frame image. Thus, the techniques described herein enable automatic adjustment of a multi-frame image that accounts for variations in a number of frames that are actually used to generate the multi-frame image.

Consider now an example environment in which various aspects as described herein can be employed.

Example Environment

FIG. 1 illustrates an example operating environment 100 in accordance with one or more embodiments. Environment 100 includes computing device 102 in the form of a mobile phone. However, computing device 102 can be configured as any other suitable type of computing device without departing from the scope of the claimed subject matter. Among other things, a user can interact with computing device 102 to capture digital images and/or video of various scenes. In this example, computing device 102 includes an image capture module 104, which represents functionality that visually adjusts multi-frame images in a manner that considers a number of individual image frames used to generate the multi-frame image, as further described herein. For discussion purposes, image capture module 104 is illustrated as a single module, but image capture module 104 can be implemented using any suitable combination of hardware, software, and/or firmware.

Image capture module includes image sensor 106 that is used to generate a digital image of a captured scene. Although illustrated as a single sensor, image sensor 106 is representative of any number of multiple image sensors implemented by computing device 102. Images can be stored in various color spaces and representations, such as Red-Green-Blue (RGB), standard Red-Green-Blue (sRGB), Luminance-Blue-Luminance-Red-Luminance (YUV), a color-opponent space with Lightness and color-opponent dimensions (CIE L*a*b), and so forth. These images can also be stored or expressed in any suitable format, such as Joint Photographic Experts Group (JPEG), Tagged Image File Format (TIFF), Graphics Interchange Format (GIF), bitmap (BMP), Portable Network Graphics (PNG), High-Dynamic-Range Imaging (HDRI), and so forth. Image sensor 106 can have various resolutions and be configured as any suitable type of image sensor in accordance with one or more implementations. As used herein, the term "image sensor" generally represents a sensor that is used to capture a corresponding image frame of a scene, and can be a single sensor, or multiple smaller sensors that work together to generate a single image frame.

Environment 100 includes a scene 114 that generally represents any suitable viewpoint or object that an image capture module can visually capture. In this example, image sensor 106 captures multiple image frames 116 of scene 114. Each of the multiple image frames 116 represents an image of scene 114 generated by exposing the image sensors 106 to light in scene 114. In some implementations, each of the multiple image frames 116 is generated using the same exposure time. In other implementations, different ones of the multiple image frames 116 are generated using different exposure times, thereby producing multiple image frames 116 having varying brightness levels among different frames of the scene 114.

In addition to the image sensor 106, image capture module 104 includes multi-frame image module 108 and image adjustment module 110. Among other things, multi-frame image module 108 represents functionality that combines the multiple frames 116 to generate a multi-frame image 118. To do so, the multi-frame image module 108 aligns at least two of the multiple frames 116 so that a given pixel location in each of the multiple frames 116 corresponds to a common point or location in the captured scene 114. In some implementations, the multi-frame image module 108 selectively combines the multiple frames 116 so that only a subset of the multiple frames 116 is used to generate the multi-frame image 118. After aligning the multiple frames 116 or subset of the multiple frames 116, multi-frame image module 108 combines pixel values describing color and brightness values for individual pixels in the multiple frames 116 and averages combined pixel values to generate pixel values for the multi-frame image 118. In this manner, a pixel value for a given pixel location in the multi-frame image 118 represents the average of pixel values for the given pixel location in each of the multiple frames 116. Thus, multi-frame image 118 is produced having an increased signal-to-noise ratio and an increased dynamic range over the signal-to-noise ratio and dynamic range of an individual frame of the multiple frames 116.

Image adjustment module 110 represents functionality that alters a visual appearance of the multi-frame image 118 by altering pixel values of the multi-frame image 118 to reduce image noise and increase the sharpness of stacked frame 118. The image adjustment module 110 is configured to automatically adjust the multi-frame image 118 to generate an output frame for display in a manner that does not require user input. In order to automatically adjust the multi-frame image 118, the image adjustment module 110 includes an adjustment parameter table 112 that identifies different image adjustment parameters for use in the automatic adjustment. In implementations, the image adjustment module 110 selects adjustment parameters from adjustment parameter table 112 based on a number of the multiple frames 116 that were used to generate the multi-frame image 118. Using the selected image adjustment parameters, the image adjustment module 110 alters pixel values of the multi-frame image 118 to generate a sharp output image of the scene 114 with minimal image noise.

Figure 2:
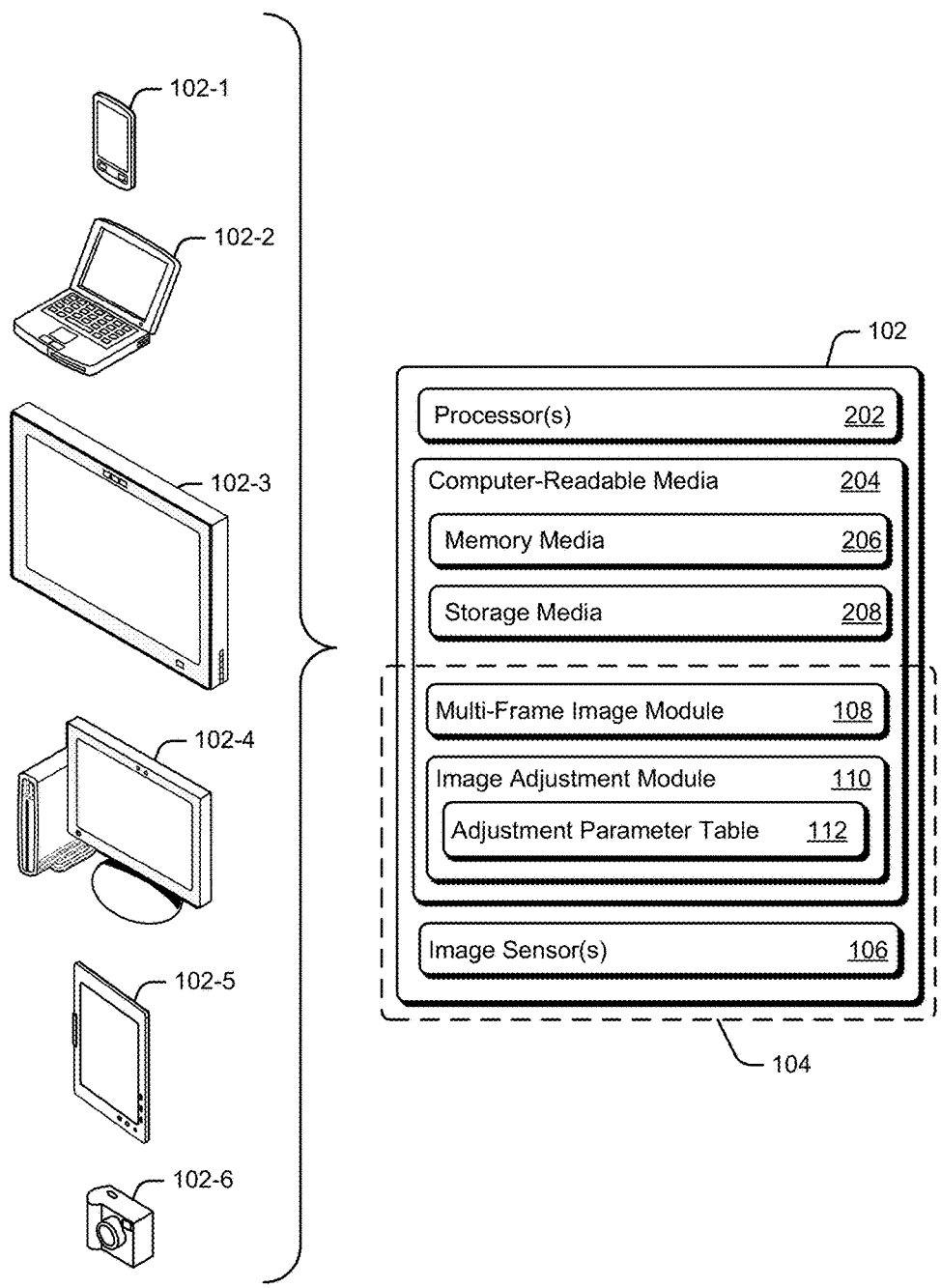
FIG. 2 illustrates a more detailed view of an example implementation included in FIG. 1 in accordance with one or more embodiments.

FIG. 2 illustrates an expanded view of computing device 102 of FIG. 1 with various non-limiting example devices including: smartphone 102-1, laptop 102-2, television 102-3, desktop 102-4, tablet 102-5, and camera 102-6. Accordingly, computing device 102 is representative of any suitable device that incorporates digital image capture and processing capabilities by way of image capture module 104. Computing device 102 includes processor(s) 202 and computer-readable media 204, which includes memory media 206 and storage media 208. Applications and/or an operating system (not shown) implemented as computer-readable instructions on computer-readable media 204 can be executed by processor(s) 202 to provide some or all of the functionalities described herein. To facilitate image capture, computing device 102 includes image capture module 104.

As illustrated in FIG. 2, portions of image capture module 104 are stored on computer-readable media 204: multi-frame image module 108, image adjustment module 110, and adjustment parameter table 112. However, although multi-frame image module 108, image adjustment module 110, and adjustment parameter table 112 are illustrated here as residing on computer-readable media 204, they each can alternately or additionally be implemented using hardware, firmware, or any combination thereof. Image capture module 104 also includes image sensors 106, which can be one or multiple image capture mechanisms.

Having described an example operating environment in which various embodiments can be utilized, consider now a discussion of digital image captures in accordance with one or more embodiments.

Digital Image Captures

Image capture mechanisms preserve an image based upon their exposure to light. An analog camera exposes a filmstrip as a way to detect or capture light. Light alters the filmstrip and, in turn, the image can be recovered by chemically processing the filmstrip. In an analog image capture, the filmstrip stores a continuous representation of the light (and corresponding scene). Digital image sensors, too, are exposed to light to capture information. However, instead of an analog representation, digital image sensors generate and store discrete representations of the image.

Figure 3:
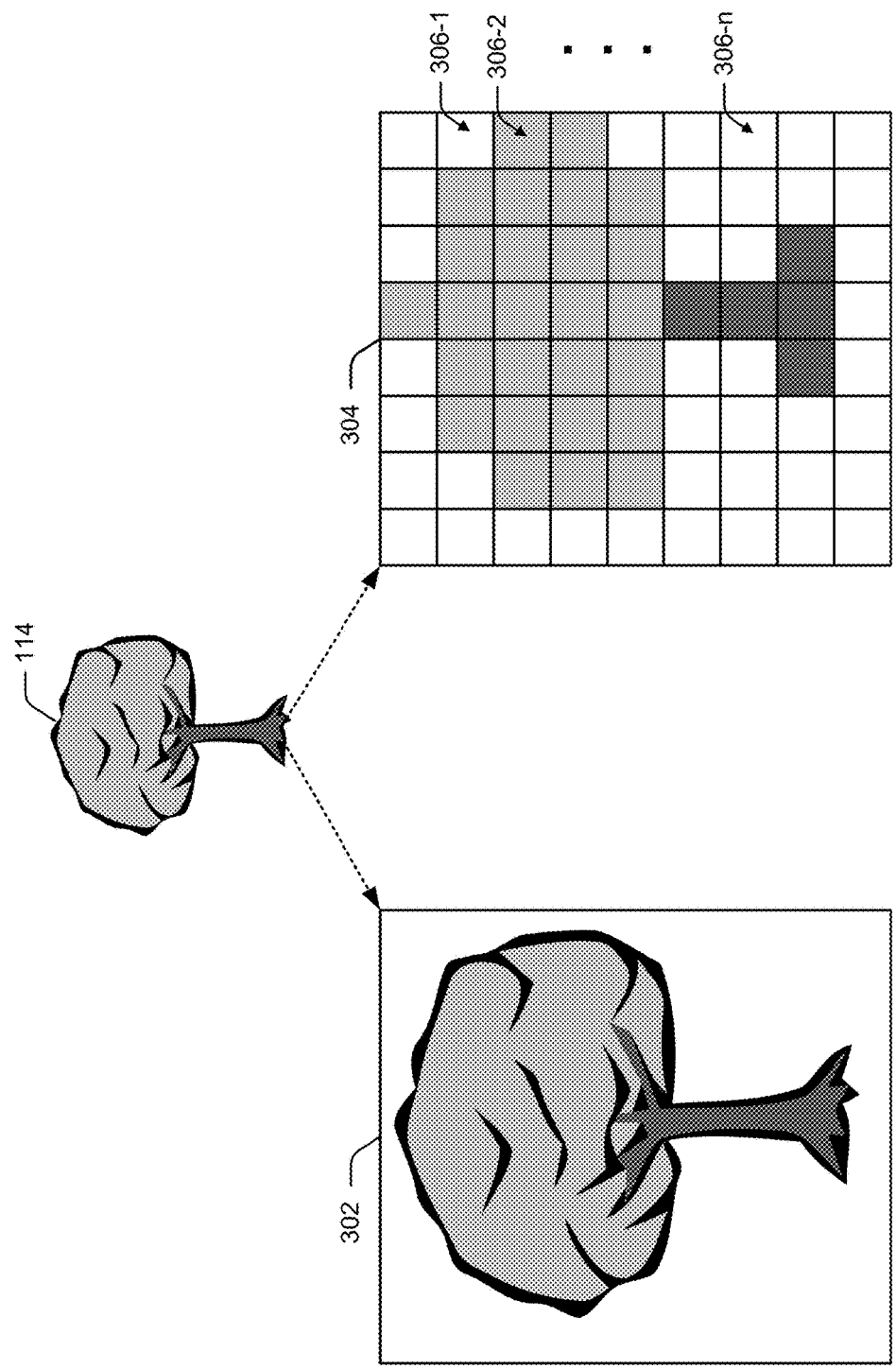
FIG. 3 illustrates an example of digitally capturing scene in accordance with one or more embodiments.

Consider FIG. 3 in which alternate image capture mechanisms are employed to capture scene 114 of FIG. 1. Image 302 illustrates an analog capture of scene 114 performed through the use of analog techniques, such as film capture. Here, the image has been captured in a continuous nature. Conversely, image 304 illustrates a digital capture of scene 114. Instead of capturing the image continuously, image 304 represents sectors of scene 114 in discrete components, alternately referred to as a pixel. Each discrete component has at least one value associated with it to describe a corresponding portion of the image being captured. For example, discrete component 306-1 represents a region of scene 114 in which the tree is not present, discrete component 306-2 represents a region of scene 114 in which a portion of the tree is present, and so forth. Accordingly, image 304 digitally represents scene 114 by partitioning the image into "n" discrete components (where "n" is an arbitrary value), and assigning a value to each component that is uniform across the whole component. Thus, discrete component 306-1 has a first value, discrete component 306-2 has a second value, and so forth all the way up to discrete component 306-*n*. Here, the term "value" is generally used to indicate any representation that can be used to describe an image. In some cases, the value may be a single number that represents an intensity or brightness of a corresponding light wave that is being captured. In other cases, the value may be a combination of numbers or vectors that correspond to various color combinations and/or luminance intensities associated with each color. Thus, the values of the discrete components provide a mathematical representation of how a captured image frame of scene 114 would visually appear to the human eye.

The size of a discrete component within a digital image, as well as the number of discrete components, affects a corresponding resolution of the image. For example, image 304 is illustrated as having 9×8=72 discrete components. However, relative to the analog capture represented in image 302, it can be seen that there are inaccuracies in the digital image capture. Given the size of each discrete component, and the uniform nature across the whole of the discrete component, the resultant image lacks details that can be found either in image 302 or original scene 114. By increasing the number of components and reducing the size of the components, the resultant digital image can more accurately capture details and add resolution to the image to more closely resemble the analog version and/or the original captured image. A pixel refers to a singular discrete component of a digital image capture that is the smallest addressable element in the image. Thus, each pixel has a corresponding address and value.

Figure 4:
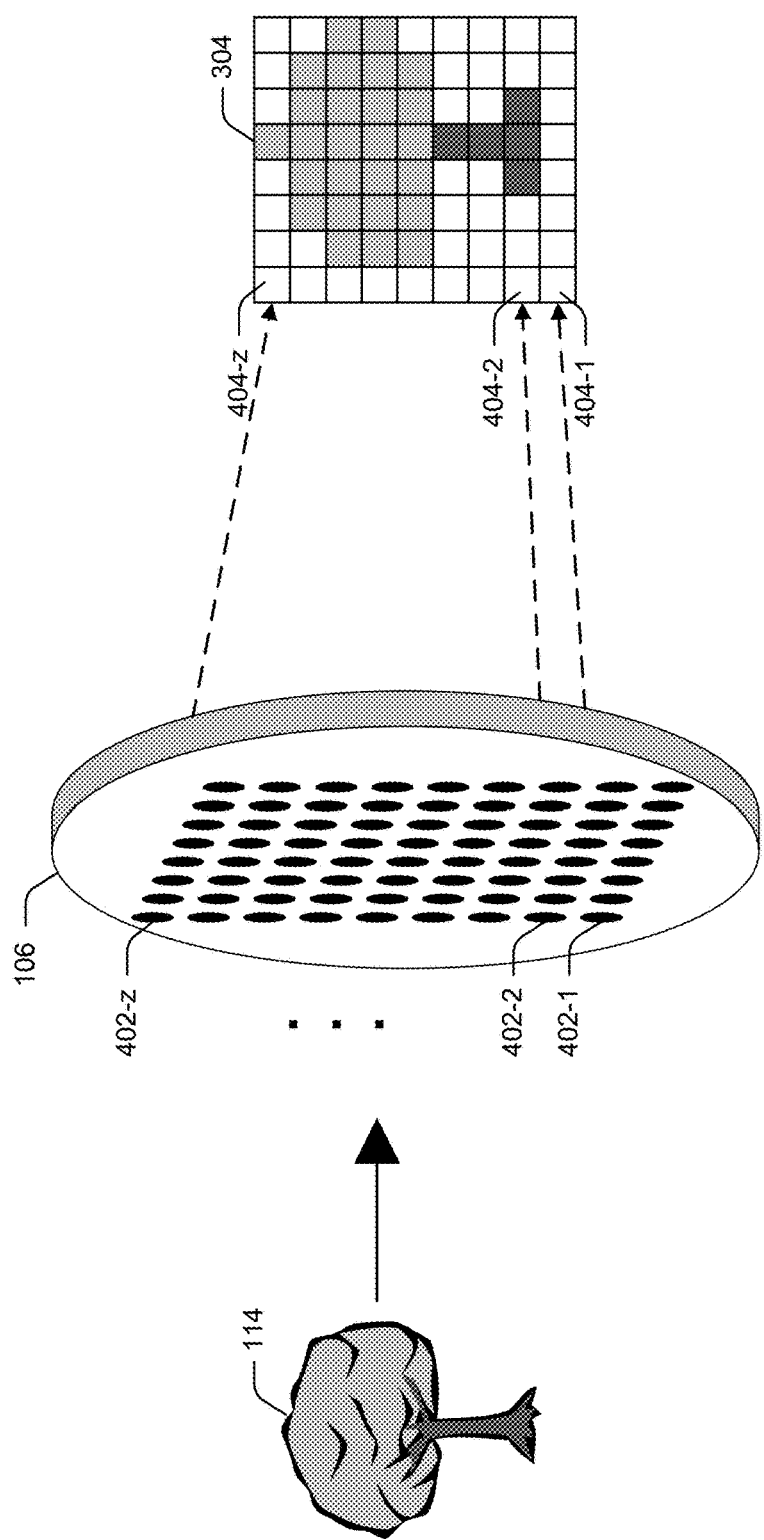
FIG. 4 illustrates an example of a digital image sensor in accordance with one or more embodiments.

A singular image sensor, such as image sensor 106 of FIG. 1, can consist of several smaller sensors. Consider FIG. 4 that includes an example of image sensor 106 from FIG. 1, scene 114 from FIG. 1, and image 304 from FIG. 3. As can be seen, image sensor 106 includes multiple smaller sensors, labeled as sensor 402-1 through sensor 402-z, where z is an arbitrary number. For simplification, these sensors will be generally referred to as sensors 402 when discussed collectively. While this example illustrates image sensor 106 as having 72 small sensors, an image sensor can have any suitable number of sensors without departing from the scope of subject matter described herein. Each sensor of sensors 402 can relate to a grid of colors (e.g., red, blue, or green), a grid of luminance, a single pixel, multiple pixels, or any combination thereof. For example, sensor 402-1 corresponds to data captured to generate pixel 404-1, sensor 402-2 corresponds to data captured to generate pixel 404-2, and sensor 402-z corresponds to data captured to generate pixel 404-z.

Although illustrated as a single entity, sensors 402 can each be considered a sensor unit, in which the unit includes multiple sensors with varying functionality. Through careful selection and configuration, the different sensors can improve the resultant image capture. In implementations, sensors 402 are configured to detect and register data describing incoming light, such as light from scene 114. Specifically, sensors 402 collect light photons for discrete components of the digital image and produce an electrical charge describing an amount of light that is detected, which can be stated in terms of luminance and is described in further detail below.

As more light is detected, sensors 402 generate larger electrical charges. Similarly, electrical charges generated by sensors 402 increase as a function of time when the sensors 402 are exposed light, such as via scene 114. For example, longer exposure times are often implemented in low-light scenarios in order to gather additional light photons emitted from scene 114, which enables the sensors 402 to register luminance values that otherwise go unregistered at shorter exposure times. The electrical charges generated by sensors 402 are then measured and converted into data describing captured luminance information for discrete components of a digital image frame.

Luminance information refers to brightness or intensity related to a discrete component of a captured image. For instance, an image or pixel with little to no brightness (e.g., dark or black) would have generally 0% luminance or brightness, while an image or pixel that is has a large amount of light has generally 100% luminance (e.g., bright or white). In implementations, a low-light scene is a scene where image sensors can detect an amount of luminance, stated in terms of lux, that is lower than a low-light lux threshold. In addition to expressing in terms of lux, luminance information can be described in any suitable manner that quantifies luminous flux per unit area of a scene. For example, the scene 114 from FIG. 1 may be a low-light scene when the image sensor 106 detects less than 30 lux.

In order to discern color information, various sensor arrays can be configured where some percentage of the sensors are associated with green, some percentage of the sensors are associated with red, and some percentage of the sensors are associated with blue. For example, the sensors 402 can be configured using a Bayer array (alternately referred to as a Bayer filter or Bayer grid), where 50% of the sensors are associated with green, 25% are associated with red, and 25% are associated with blue. Thus, a general red, green, blue ("RGB") image sensor used to capture an image may utilize multiple smaller green image sensors, multiple smaller blue image sensors, and multiple smaller red image sensors to make up the overall general RGB image sensor. These smaller sensors capture characteristics about the incoming light with respect to colors, as well as luminance intensity characteristics, as described herein. In turn, the values stored for each captured image frame represent brightness and color characteristics for an image captured by an image sensor. Values describing color characteristics for an image are alternatively referred to as chrominance information.

Chrominance information generally refers to color information captured by an image sensor, such as each of sensors 402. As a mathematical representation, chrominance information refers to a quantifiable difference between a given color in a discrete component of a captured image and a standard color of equal luminance. Luminance information and chrominance information for a given image frame play an important role in the overall visual representation of the image frame.

For example, image noise and image sharpness are two important visual factors of an image frame that change based on luminance and chrominance differences among discrete components of an image frame. Image noise generally refers to random variations of luminance information and/or chrominance information that occurs in a captured image frame but does not occur in a natural scene represented by the captured image frame. In digital imaging implementations, image noise is the result of electronic noise produced by an image sensor or electronic circuitry of a digital imaging device. For example, the image 304 may include variations in brightness or color information from the actual brightness and color information naturally occurring in the scene 114. In this example, the variations in brightness or color information may be generated by electronic interference of a device capturing image 304, such as the computing device 102 of FIG. 1. In this example, variations in brightness and color information may be caused by any component of computing device 102, such as image capture module 104, image sensors 106, multi-frame image module 108 and/or image adjustment module 110.

Image sharpness generally refers to the subjective quality of an image frame as it appears to the human eye. A sharp image frame can be described as an image frame that provides a clear and distinct representation of a captured scene as it naturally occurs. By contrast, a soft image frame can be described as an image frame that does not provide a clear or distinct representation of the captured scene as it naturally occurs. The sharpness of an image can additionally be described in terms of acutance, which describes changes in amplitude of luminance values with respect to space in an image frame. In terms of luminance values, the human eye will perceive an image frame as a sharp image if there are large differences between luminance values of adjacent frame pixels. Conversely, the human eye will perceive the same image frame as softer as differences between luminance values of adjacent frame pixels decreases. Thus, luminance values of individual pixels in an image frame have a substantial impact on the overall visual appearance of the image frame.

Thus, using the techniques described herein, image 304 has multiple discrete components that each correspond to a respective value (or values) that represent a visual representation of a captured scene 114 as it appears to the human eye. While the above discussion refers to example RGB sensor configurations, it is to be appreciated that other color combinations, sensor types, and captured sensor characteristics can be used without departing from the scope of the claimed subject matter.

These examples are for discussion purposes, and are not intended to be limiting. Further, the technical aspects of digital image capture have been simplified, and are not intended to describe all aspects of digital image capture, image sensor configurations, color formats, filters, and so forth. Having described various principles associated with digital image capture, now consider a discussion of generating a multi-frame image and adjusting a visual appearance of the multi-frame image based on a number of frames used to generate the multi-frame image.

Multi-Frame Image Generation and Adjustment

Various approaches are used to process multiple image frames of a captured scene into a single image frame, in order to provide an improved visual representation of the captured scene. This single image frame is referred to herein as a multi-frame image. In accordance with one or more implementations, a multi-frame image is generated using multiple frame high dynamic range (HDR) photography, multi-cameras image fusion, or frame stacking techniques. In implementations where the multi-frame image is generated from frame stacking, the multi-frame image can be interchangeably referred to as a "stacked image frame", a "stacked image", or a "stacked frame". A stacked frame is generated by multiple different image frames of a common scene such that discrete components of each of the multiple frames are aligned based on an area of the captured scene. Data describing luminance and chrominance information from aligned discrete components can then be summed and averaged to obtain average luminance and chrominance information. In implementations, image noise can be modeled as a standard distribution error centered at a value, such as a pixel value describing chrominance and luminance information for a captured scene. Thus, average luminance and chrominance information reduces image noise and produces a stacked frame that represents visual characteristics of a captured scene more accurately than a frame with raw luminance and chrominance information.

Multi-frame images are particularly useful in low-light image capture implementations, where longer exposure times are used to capture as much light as possible. Although increasing exposure time increases an amount of light that can be detected by an image sensor, it also increases a likelihood of image noise being introduced into a captured image frame. Accordingly, combining image frames captured in low-light scenes can produce a multi-frame image with an accurate representation of illuminance differences in the scene and less image noise than any of the individual frames used to generate the multi-frame image.

Using the techniques described herein, a device is designed to automatically generate multi-frame images in low-light scenes so that photographers of any skill level can capture high-quality images without needing expertise required to fine-tune device camera settings.

In order to understand visual implications of generating a multi-frame image from multiple image frames, consider the following discussion of generating a multi-frame image using frame stacking. Generally, a signal to noise ratio for a stacked frame improves as a number of individual frames used to generate the stacked frame increases. Thus, the visual quality of a stacked frame is dependent on the number of individual frames used. However, increasing the number of individual frames in a stacked frame also causes a performance trade-off because it requires additional time to capture all the individual frames before the stacked frame can be generated. Accordingly, to improve user experience, a device implementing the techniques described herein can limit the number of individual frames used to generate a stacked frame by limiting an amount of time used to capture and buffer frames. For example, computing device 102 from FIG. 1 can limit the frame stacking module 108 to a threshold amount of time for capturing and buffering individual image frames. In implementations, this threshold amount of time can vary, and may be user-specified.

In scene capture scenarios with ideal lighting, visual characteristics of a stacked frame improve as additional individual frames are used to generate the stacked image. Thus, in ideal lighting conditions it is beneficial for the image capture module 104 from FIG. 1 to capture the multiple image frames 116 using a shorter frame rate to increase a number of the multiple image frames 116 that can be captured and buffered to generate multi-frame image 118 within a threshold amount of time.

However, generating a multi-frame image 118 that provides an accurate visual representation of scene 114 is only possible if the multiple image frames 116 captured by the image capture module 104 include pixel values that accurately represent a visual appearance of scene 114. As described above, an appropriate frame rate to use when capturing individual frames of scene 114 depends on an amount of light emitted by scene 114 that can be detected by image sensor 106. In implementations, the image capture module 104 is configured to automatically adjust a frame rate at which the image sensor 106 captures the multiple image frames 116 based on an amount of detectable light. For example, the image capture module 104 causes the image sensor 106 to decrease its frame rate when an amount of detectable light decreases, thereby increasing an amount of incident light per frame that can be captured by the image sensor 106.

Thus, when performing image capture, image capture module 104 first determines an amount of light that can be detected by the image sensor 106 and selects a frame rate to be used in capturing the multiple image frames 116 based on the detectable amount of light. Image capture module 104 proceeds to capture multiple image frames 116 at the selected frame rate until a threshold amount of time has elapsed. After the threshold amount of time has elapsed, the multiple image frames 116 are buffered and analyzed to determine pixel values for each frame. Analyzing pixel values for individual frames can be performed using any suitable image analysis technique.

Figure 5:
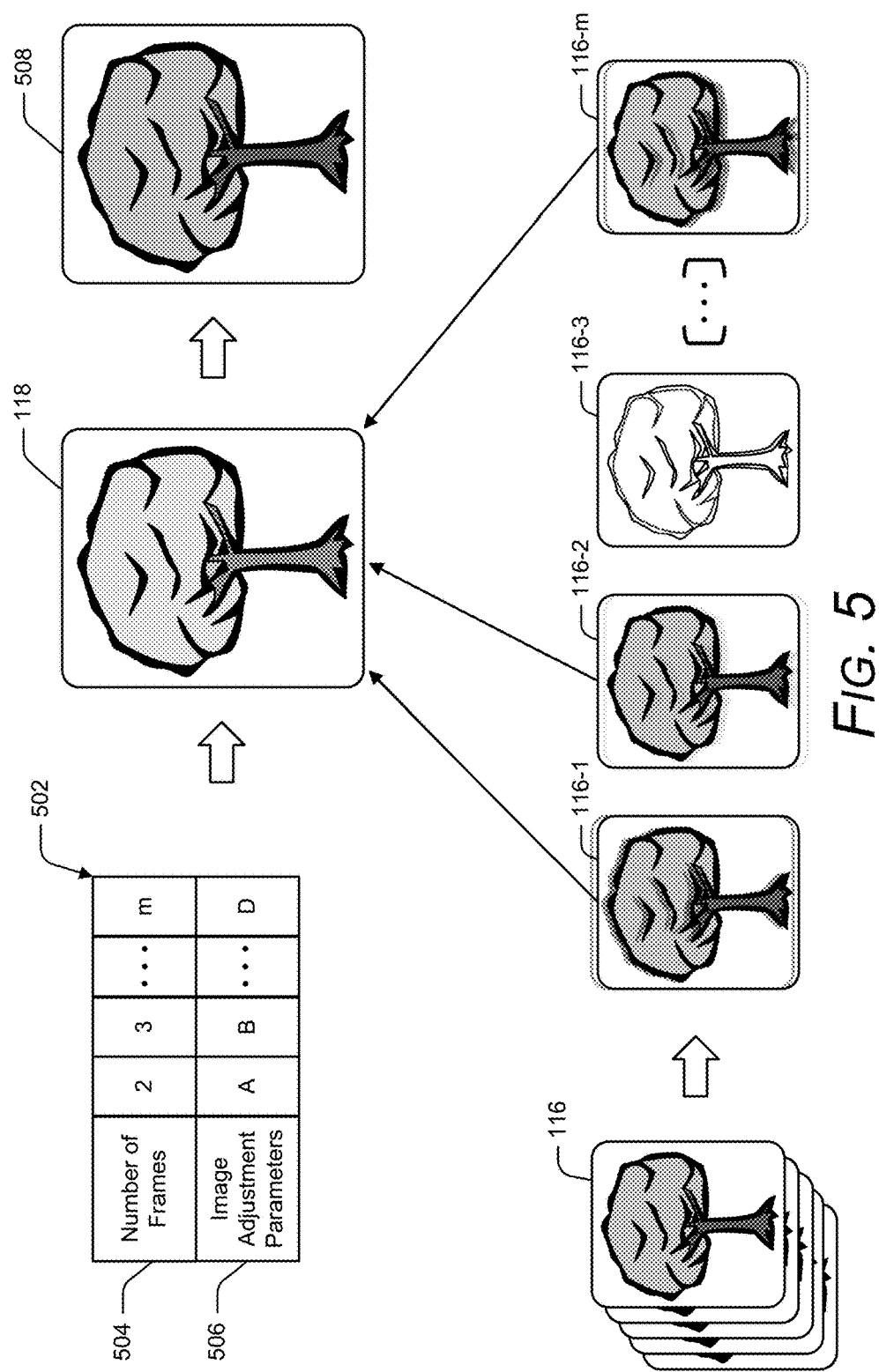
FIG. 5 illustrates an example of generating an output image from a multiple-frame image in accordance with one or more embodiments.

FIG. 5 illustrates an example of generating a multi-frame image from different individual image frames and adjusting a visual appearance of the stacked image frame to generate an output image that provides a sharp visual representation of a captured scene with minimal noise. In the illustrated example, multi-frame image 118 is generated using pixel value information from multiple image frames 116. After it is generated, the multi-frame image 118 can be adjusted according to parameters selected from adjustment parameter table 502 to produce an output image 508. Image frames 116-1, 116-2, 116-3, and 116-$m$ represent multiple image frames 116 of a scene that were captured during a threshold period of time. Any number of frames can be used to generate a stacked image frame, thus "m" can represent any integer, and is limited only by a frame rate and an amount of time used to capture the multiple image frames 116.

After the multiple image frames 116 have been captured, image frames 116-1, 116-2, 116-3, and 116-$m$ are automatically aligned and processed to generate the stacked image frame 118. The image frames 116-1, 116-2, 116-3, and 116-$m$ are automatically aligned by positioning the different image frames relative to one another based on pixel values, such that aligned frames have similar pixel value distributions within a given space. In implementations, the multiple image frames 116 can be aligned using any suitable image alignment technique, and can be performed automatically in a manner that does not require user input to assist in the image alignment. However, frame alignment issues can arise when motion blur exists in an image frame, such as motion blur that occurs as a result of movement of a subject in the scene or movement of the image sensor during frame exposure.

Accordingly, the multi-frame image 118 is often generated from the multiple image frames 116 using only a subset of the multiple image frames. As described herein, a subset of the multiple frames 116 can include any number of image frames that is less than or equal to a number of image frames in the multiple frames 116. For example, in FIG. 5 image frame 116-3 is illustrated as having visual characteristics that prevent the image frame 116-3 from being automatically aligned with image frames 116-1, 116-2, and 116-$m$. Accordingly, although m different image frames 116 were captured and buffered, the multi-frame image 118 is generated by combining a subset of the multiple image frames 116 that includes image frame 116-1, 116-2, and 116-$m$.

In order to generate multi-frame image 118, after a subset of the multiple image frames 116 are aligned, individual pixel values for each pixel address in the multi-frame image 118 are determined by summing and averaging pixel values from corresponding pixel addresses in each of the subset of image frames 116-1, 116-2, and 116-$m$. As described herein, the multi-frame image 118 provides an improved visual representation of a captured scene in comparison to any one of image frames 116-1, 116-2, and 116-$m$. However, the visual quality of the multi-frame image 118 can be further improved using various post-processing techniques.

For example, various image post-processing techniques can be used to adjust a visual appearance of the multi-frame image 118 in a manner that reduces image noise and improves image sharpness. Adjusting a visual appearance of the multi-frame image 118 can be performed by a computing device implementing the techniques described herein, such as by the computing device 102 implementing image adjustment module 110 from FIG. 1. In implementations, changing pixel values of the multi-frame image 118 can be automatically performed to generate output image 508 by visually altering the multi-frame image 118 according to a set of adjustment parameters. The set of adjustment parameters refers to a set of rules and/or algorithms for changing pixel values to alter an image's visual appearance, and can be configured to alter pixel values of the multi-frame image 118 in any suitable manner.

For example, image adjustment parameters designed to adjust image sharpness can specify various rules for adjusting pixel values in a manner that increases or decreases pixel luminance values based on a comparison of a pixel value to a threshold pixel value. In this example, pixel luminance values that are below the threshold pixel value may be decreased to create a darker pixel. Likewise, pixel luminance values that are above the threshold pixel value may be increased to create a brighter pixel. These example image adjustment parameters thus specify a set of rules for adjusting pixel values of the multi-frame image 118 in a manner that exaggerates visual contrast between lighter and darker pixels and therefore increases image sharpness. Although described in the context of adjusting image sharpness, this example is not intended to be limiting and the image adjustment parameters described herein refer to any set of rules describing mathematical relationships and/or algorithms for changing pixel values to alter a visual appearance of a multi-frame image.

Manually adjusting an image to alter a visual appearance by fine-tuning image sharpness and removing image noise can be a time-intensive process for even an experienced image-editing professional. Accordingly, in order to enable automatic image adjustment without requiring user input, an image adjustment module, such as image adjustment module 110 from FIG. 1, is configured to use predetermined image adjustment parameters to alter the visual appearance of an image. For example, the image adjustment module 110 can adjust a visual appearance of multi-frame image 118 using image adjustment parameters from adjustment parameter table 502 to generate output image 508. In implementations, the adjustment parameter table 502 is stored by the image adjustment module 110 as adjustment parameter table 112, as illustrated and described above with respect to FIG. 1.

Using the adjustment parameter table 502, an appropriate set of image adjustment parameters can be identified and selected for adjusting a visual appearance of the multi-frame image 118 automatically without requiring additional user input. For example, in implementations adjustment parameter table 502 can be used to select adjustment parameters for adjusting image noise and a sharpness of multi-frame image 118. However, because a number of the multiple image frames 116 that were used to generate the multi-frame image 118 affects a resulting visual appearance of the stacked image frame 118, adjustment parameter table 502 is configured to store different sets of image adjustment parameters to account for multi-frame images that are generated from different numbers of individual frames. For example, consider a multi-frame image generated using five individual image frames in comparison to a multi-frame image generated using two individual image frames. As described above, the multi-frame image generated from five image frames would result in noise less noise and increased sharpness in comparison to the multi-frame image generated using only two image frames. Accordingly, adjustment parameters designed for reducing noise and improving sharpness in the 5-frame stacked image, when applied to the 2-frame stacked image, would result in generating an output image that is visually soft and noisy.

Thus, by configuring adjustment parameter table 502 to include different image adjustment parameters that vary to account for a number of individual frames used to generate multi-frame image 118, the techniques described herein enable a device to visually adjust a multi-frame image generated using any number of individual image frames. In implementations, the adjustment parameter table 502 is configured to organize different image adjustment parameters based on different numbers of individual frames that were combined to generate multi-frame image 118. For example, adjustment parameter table 502 is illustrated as including row 504, which includes information specifying different numbers of possible frames "m" that were captured and buffered to generate the multi-frame image 118. Adjustment parameter table 502 additionally includes row 506, which includes information describing different adjustment parameters that can be applied to the multi-frame image 118 to generate output image frame 508. Rows 504 and 506 of adjustment parameter table are organized based on different numbers of image frame combinations, such that 2 image frames are associated with image adjustment parameters "A", 3 image frames are associated with image adjustment parameters "B", "m" image frames are associated with image adjustment parameters "D", and so on. Accordingly, using the techniques described herein, different adjustment parameters are selected for adjusting the visual appearance of a multi-frame image from adjustment parameter table 502 based on a number of frames that were used to generate the multi-frame image. Although described and illustrated as a table, information included in adjustment parameter table 502 can be organized in any suitable manner that classifies different image adjustment parameters based on a number of individual frames used to generate a multi-frame image.

For example, adjustment parameter entries in the adjustment parameter table 502 can specify parameters for different image adjustment techniques, such as techniques for adjusting image sharpness and techniques for reducing image noise. In this example, each of the image adjustment parameters in row 506 can specify different sets of parameters for each of the image sharpness adjustment and image noise reduction techniques. In implementations, the different sets of parameters are predefined to account for different combinations of individual frames used to generate multi-frame image 118.

For example, parameters for adjusting image sharpness can include filter settings for a filter applied to multi-frame image 118. In implementations, the filter settings can describe a cross-type median filter smoothing percentage. Additionally, image sharpness adjustment parameters can include mathematical weights describing a degree of enhancement to apply to individual pixel values based on a comparison between a value of a pixel and neighboring pixel values. In implementations, these mathematical weights can be described as edge enhancement strengths that are optionally limited by a noise threshold. Additionally or alternatively, image sharpness adjustment parameters can include clamping levels describing a range of luminance or chrominance values in which a pixel value can be adjusted, based on a comparison of neighboring pixel values. In implementations, the image sharpness adjustment parameters for a multi-frame image 118 generated from two frames is different from a set of image sharpness adjustment parameters for a multi-frame image 118 generated from three frames. Accordingly, image sharpness adjustment parameters "A" and "B" in adjustment parameter table 502 differ from one another. In addition to these example image sharpness adjustment parameters, adjustment parameter table 502 can include parameters for any variety of image sharpness adjustment techniques.

Additionally or alternatively, adjustment parameter entries in the adjustment parameter table 502 can specify parameters for reducing image noise. For example, parameters for reducing image noise can include mathematical weights for altering different pixel values in multi-frame image 118 based on a number of image frames that were used to generate the multi-frame image 118. These mathematical weights can include de-noising weights or de-noising scale values describing a percentage at which an individual pixel value can be changed based on a comparison between a value of a pixel and neighboring pixel values. In implementations, the image noise reduction parameters for a multi-frame image 118 generated from two frames is different from a set of image noise reduction parameters for a multi-frame image 118 generated from three frames. Accordingly, image noise reduction parameters "A" and "B" in adjustment parameter table 502 differ from one another.

A device implementing the techniques described herein generates the output image 508 by selecting image adjustment parameters from adjustment table 502 based on a number of individual frames used to generate multi-frame image 118 and applying the selected image adjustment parameters to the multi-frame image 118. In the illustrated example of FIG. 5, because the multi-frame image 118 was generated from three individual image frames 116-1, 116-2, and 116-m, multi-frame image 118 is visually modified using image adjustment parameters "B", which corresponds to a set of image adjustment parameters to use for a stacked image frame generated from three different frames. The output image 508 can then be output for display in a manner that represents a captured scene with improved visual qualities over that of an output image generated from a single one of the multiple image frames 116. Thus, image adjustment based on combining pixel values of different individual frames allows for the automatic capture and digital representation of a scene.

Figure 6:
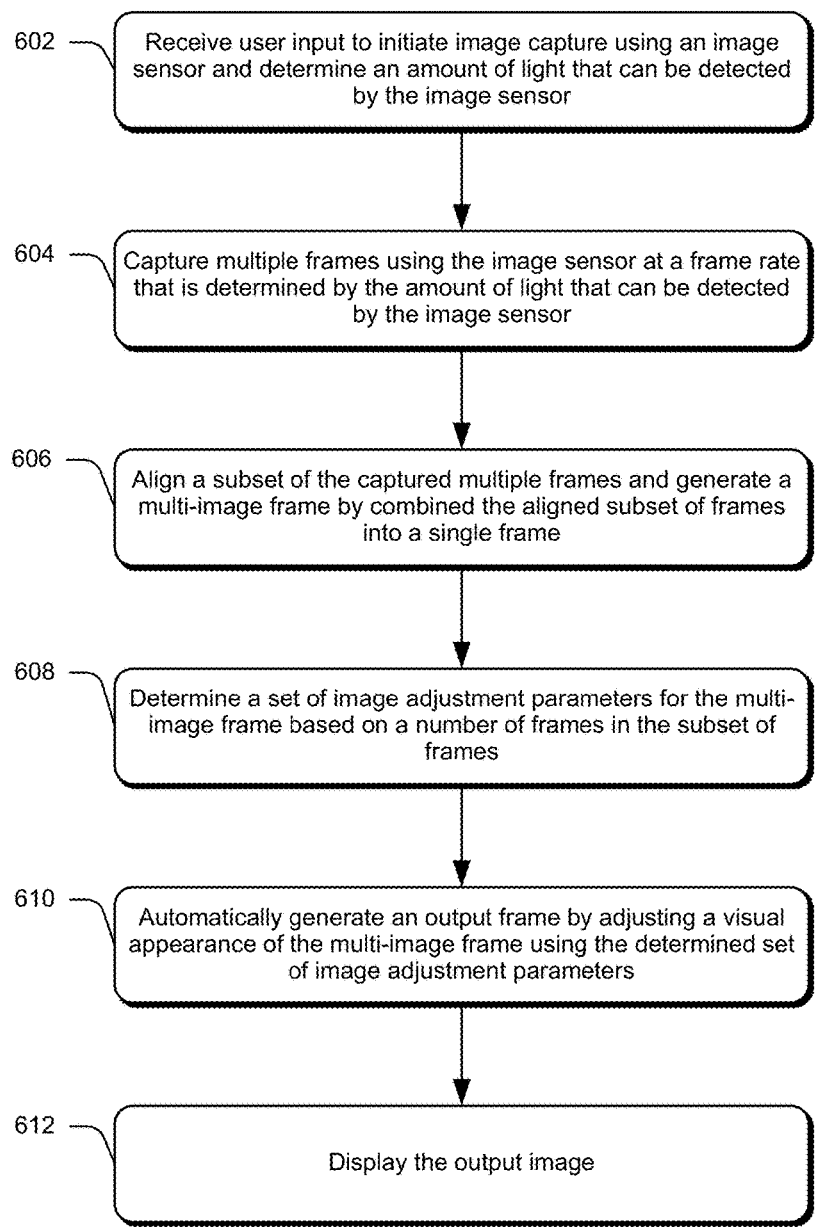
FIG. 6 illustrates a flow diagram in which image adjustment based on frame stacking is employed in accordance with one or more embodiments.

Consider FIG. 6, which illustrates a method of image adjustment for multi-frame images in accordance with one or more embodiments. The method can be performed by any suitable hardware, software, firmware, or combination thereof. In at least some embodiments, aspects of the method can be implemented by one or more suitably configured hardware components and/or software modules, such one or more components included in image capture module 104 of FIG. 1.

Step 602 receives user input to initiate image capture using an image sensor and determines an amount of light that can be detected by the image sensor. For example, a device implementing the image capture module 104 can receive user input via a button or other input device to initiate imaging of a scene. In implementations, the image sensor can generate information describing luminance values for light emitted by a scene to be captured. Using the example illustrated in FIG. 1, user input can be received at computing device 102 to initiate image capture of the scene 114 using the image sensor 106.

Responsive to receiving the user input, step 604 captures multiple frames with the image sensor at a frame rate that is determined based on the amount of light that can be detected by the image sensor. In implementations, a frame rate used to capture the multiple frames decreases as an amount of detectable light decreases in order to increase the exposure time of an individual frame to detectable light from the captured scene. Similarly, the frame rate used to capture a scene increases as an amount of detectable light increases to prevent over-exposure of an individual frame. Frames of a scene are captured at the determined frame rate for a threshold amount of time and buffered in order to determine pixel values for individual captured frames. In the illustrated example of FIG. 1, the computing device 102 captures the multiple image frames 116 of scene 114 using the image sensor 106 at the determined frame rate for a threshold amount of time. Frame stacking module is configured to buffer each of the multiple image frames 116 to ascertain pixel values describing a visual appearance of individual frames.

Step 606 aligns a subset of the captured multiple frames and generates a multi-frame image by combining pixel values from the aligned subset of frames into a single image. A subset of frames from the multiple captured frames can be automatically aligned in a manner that does not require user input using any suitable technique. In implementations, the subset of frames are aligned by positioning individual frames relative to one another such that distributions of pixel values among the subset of frames are similar to one another for any given area in the frame. A multi-frame image is generated from the subset of aligned frames by summing and averaging pixel values from the subset of aligned frames for each pixel address in the multi-frame image. For example, pixel values from a subset of the multiple image frames 116 illustrated in FIG. 1 can be summed and averaged to generate multi-frame image 118, such that the multi-frame image 118 is visually sharper with less image noise than any one of the multiple image frames 116.

Step 608 determines a set of image adjustment parameters for the multi-frame image based on a number of individual frames in the subset of frames that were used to generate the multi-frame image. In implementations, the set of image adjustment parameters can be automatically selected from a table that specifies different sets of image adjustment parameters to use for different amounts of individual image frames used to generate a multi-frame image. For example, image adjustment module 110 from FIG. 1 can determine a set of image adjustment parameters from adjustment parameter table 112 to automatically generate an output image from multi-frame image 118. The set of image adjustment parameters to be used in generating the output image from multi-frame image 118 is thus selected as a function of a number of the multiple image frames 116 that were actually used to generate the multi-frame image 118.

After determining an appropriate set of image adjustment parameters, step 610 automatically generates an output frame by adjusting a visual appearance of the multi-frame image using the determined set of image adjustment parameters. In implementations, the set of image adjustment parameters includes a set of rules for altering pixel values of the multi-frame image to change a visual appearance of the multi-frame image. Any suitable image adjustment parameters can be included in the determined set of image adjustment parameters. For example, a set of image adjustment parameters may include adjustment parameters for reducing image noise in the multi-frame image based on pixel values in the multi-frame image. Alternatively or additionally, the set of image adjustment parameters may include adjustment parameters for adjusting a visual sharpness of the multi-frame image based on pixel values in the multi-frame image. In the illustrated example of FIG. 1, the image adjustment module 110 selects adjustment parameters from adjustment parameter 112 and applies the selected adjustment parameters to multi-frame image 118 to generate an output image.

Step 612 displays the output image for viewing. For example, an output image generated by applying image adjustment parameters to the multi-frame image 118 can be displayed via a display device of computing device 102, as illustrated in FIG. 1. Thus, the techniques described herein enable automatic image adjustment for a multi-frame image in a manner that enables capture and display of high quality images even when the images are captured in low-light scenes.

While the method described in FIG. 6 illustrates these steps in a particular order, any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

Having considered a discussion of image adjustment for a multi-frame image, consider now a discussion of an example device which can include image adjustment techniques for a multi-frame image in accordance with various embodiments described herein.

Example Device

Figure 7:
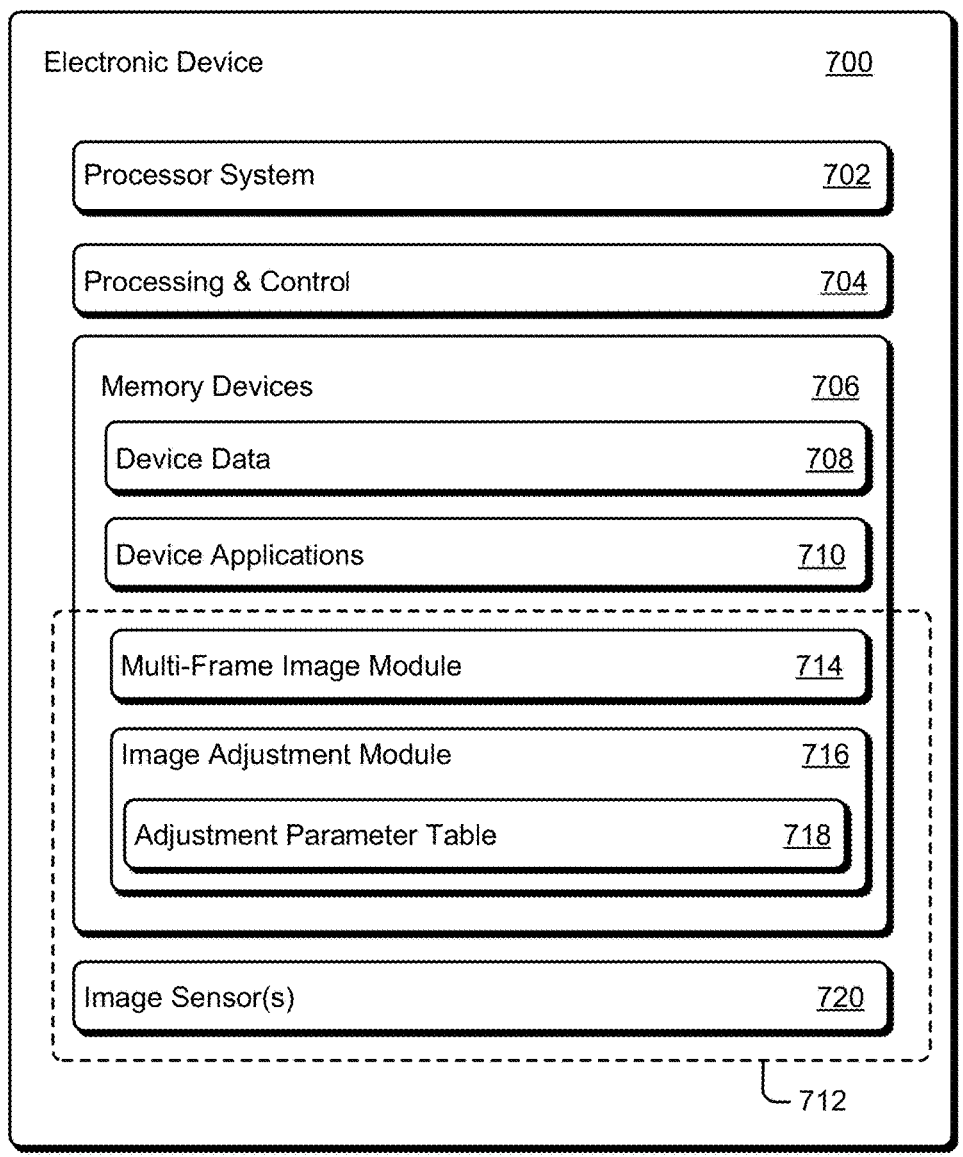
FIG. 7 is an illustration of an example device in accordance with one or more embodiments.

FIG. 7 illustrates various components of an example electronic device 700 that can be utilized to implement the embodiments described herein. Electronic device 700 can be, or include, many different types of devices capable of implementing image adjustment based on an amount of frames used to generate a multi-frame image, such as multi-frame image module 108, adjustment parameter table generator module 110, and/or image adjustment module 112 of FIG. 1.

Electronic device 700 includes processor system 702 (e.g., any of application processors, microprocessors, digital-signal processors, controllers, and the like) or a processor and memory system (e.g., implemented in a system-on-chip), which processes computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternately or in addition, the electronic device can be implemented with any one or combination of software, hardware, firmware, or fixed-logic circuitry that is implemented in connection with processing and control circuits, which are generally identified as processing and control 704. Although not shown, electronic device 700 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Electronic device 700 also includes one or more memory devices 706 that enable data storage, examples of which include random access memory (RAM), non-volatile memory (e.g., read-only memory (ROM), flash memory, EPROM, EEPROM, etc.), and a disk storage device. Memory devices 706 are implemented at least in part as a physical device that stores information (e.g., digital or analog values) in storage media, which does not include propagating signals or waveforms. The storage media may be implemented as any suitable types of media such as electronic, magnetic, optic, mechanical, quantum, atomic, and so on. Memory devices 706 provide data storage mechanisms to store the device data 708 and other types of information or data. In some embodiments, device data 708 includes digital images. Memory devices 706 also provide storage for various device applications 710 that can be maintained as software instructions within memory devices 706 and executed by processor system 702.

To facilitate image capture, electronic device 700 includes image capture module 712. Here, portions of image capture module 712 reside on memory devices 706: multi-frame image module 714, image adjustment module 716, and adjustment parameter table 718. Additionally, other portions of image capture module 712 are implemented in hardware, such as image sensors 720. While illustrated here as residing on memory devices 706, alternate embodiments implement multi-frame image module 714, image adjustment module 716, and adjustment parameter table 718 using varying combinations of firmware, software, and/or hardware.

Among other things, multi-frame image module 714 aligns a subset of individual image frames captured using image sensors 720 and combines the aligned frames to generate a multi-frame image. In accordance with various implementations, the multi-frame image module 714 sums and averages pixel values from each of the subset of individual image frames, so that the multi-frame image provides a sharper visual representation of a captured scene having less noise than the individual frames used to generate the multi-frame image. Image adjustment module 716 automatically alters a visual appearance of the multi-frame image generated by multi-frame image module 714 to further sharpen the stacked frame and to remove any image noise resulting from the combination of different individual frames. In some implementations, image adjustment module 716 selects image adjustment parameters for use in adjusting the multi-frame image based on a number of individual frames that were used to generate the multi-frame image. In implementations, image adjustment parameters are stored in adjustment parameter table 718 and can be selected by the image adjustment module 716 based on an amount of individual frames used to generate a multi-frame image. Image adjustment module 716 then automatically adjusts the multi-frame image using the selected image adjustment parameters to generate a visually sharp and noise-free image.

Image sensor(s) 720 represent functionality that digitally captures frames of scenes using any suitable technique. For example, an image sensor can capture a color image using Bayer techniques, can capture clear images, and so on. The sensors can be individual sensors that generate an image capture, or include multiple smaller sensors that work in concert to generate an image capture.

Although electronic device 700 includes distinct components, this is merely for illustrative purposes, and is not intended to be limiting. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A computing device comprising:
   an image sensor;
   at least one processor;
   an image capturer including multiple instructions that, when executed by the at least one processor, capture multiple image frames of a scene;
   a multi-frame imager including multiple instructions that, when executed by the at least one processor, generate, when an amount of light that can be detected by the image sensor is less than a threshold amount of detectable light, a multi-frame image using a subset of the multiple image frames captured by the image capture module; and
   an image adjuster including multiple instructions that, when executed by the at least one processor, generate an output image frame by applying a set of adjustment parameters to the multi-frame image that are selected based on a number of frames included in the subset of frames used to generate the multi-frame image.

2. The computing device as recited in claim 1, wherein the image capturer is configured to capture the multiple image frames at a frame rate that is determined based on the amount of light that can be detected by the image sensor.

3. The computing device as recited in claim 1, wherein a number of captured multiple image frames of the scene is greater than or equal to the number of image frames included in the subset of the multiple image frames.

4. The computing device as recited in claim 1, wherein the multi-frame image is generated using one of multiple frame high dynamic range (HDR) photography, frame-stacking techniques, or multi-cameras image fusion techniques.

5. The computing device as recited in claim 1, wherein the image adjuster is configured to determine the set of adjustment parameters automatically and without requiring user input by querying a predetermined table of adjustment parameters with the number of frames included in the subset of frames.

6. The computing device as recited in claim 1, wherein the set of adjustment parameters includes a set of rules, defined based upon the number of frames included in the subset of frames used to generate the multi-frame image, for adjusting pixel values of the multi-frame image to alter a visual sharpness of the multi-frame image.

7. The computing device as recited in claim 6, wherein the set of rules for adjusting pixel values of the multi-frame image to alter the visual sharpness of the multi-frame image include mathematical weights describing a degree of enhancement to apply to individual pixel values of the multi-frame image.

8. The computing device as recited in claim 1, wherein the set of adjustment parameters includes a set of rules, defined based upon the number of frames used to generate the multi-frame image, for adjusting pixel values of the multi-frame image to reduce image noise in the multi-frame image.

9. The computing device as recited in claim 8, wherein the set of rules for adjusting pixel values of the multi-frame image to reduce image noise specify mathematical weights describing an amount of change that can be applied to a pixel's value based on neighboring pixel values.

10. The computing device as recited in claim 1, wherein the set of adjustment parameters selected based on a first number of frames included in the subset of frames is different from a set of adjustment parameters selected based on a second number of frames included in the subset of frames.

11. A camera comprising:
    at least one image sensor;
    at least one processor; and one or more computer-readable storage devices comprising processor executable instructions that, responsive to execution by the at least one processor, perform multi-frame image generation and adjustment operations in response to determining that an amount of light that can be detected by the at least one image sensor is less than a threshold amount of light, the multi-frame image generation and adjustment operations comprising:
receiving a plurality of different image frames of a scene that are each captured by the at least one image sensor;
generating a multi-frame image using pixel values from a subset of the plurality of different image frames for each pixel in the multi-frame image;
determining a set of adjustment parameters for altering a visual appearance of the multi-frame image based on a number of image frames in the subset of image frames; and
generating an output image by adjusting a visual appearance of the multi-frame image using the determined set of adjustment parameters.

12. The camera as recited in claim 11, wherein the determined set of adjustment parameters includes at least one of a set of rules for adjusting pixel values of the multi-frame image to alter a visual sharpness of the multi-frame image or a set of rules for adjusting pixel values of the multi-frame image to reduce image noise in the multi-frame image.

13. The camera as recited in claim 11, wherein determining the set of adjustment parameters comprises determining a first set of adjustment parameters when the multi-frame image is generated using a first amount of image frames and determining a second set of adjustment parameters that are different from the first set of adjustment parameters when the multi-frame image is generated using a second amount of image frames.

14. A computer-implemented method comprising:
determining, by a computing device, that an amount of light that can be detected by an image sensor of the computing device is less than a threshold amount of detectable light;
capturing, by the computing device, multiple image frames of a scene using the image sensor in response to determining that the amount of light that can be detected by the image sensor is less than the threshold amount of detectable light;
generating, by the computing device, a multi-frame image using a subset of the captured multiple image frames of the scene; and
generating, by the computing device, an output image frame by applying a set of adjustment parameters to the multi-frame image that are selected based on a number of frames included in the subset of frames used to generate the multi-frame image.

15. The computer-implemented method as recited in claim 14, further comprising capturing the multiple image frames at a frame rate that is determined based on the amount of light that can be detected by the image sensor.

16. The computer-implemented method as recited in claim 14, further comprising including a number of image frames in the subset of the multiple image frames that is less than or equal to a number of captured multiple image frames of the scene.

17. The computer-implemented method as recited in claim 14, further comprising generating the multi-frame image using multiple frame high dynamic range (HDR) photography, a frame-stacking technique, or a multi-cameras image fusion technique.

18. The computer-implemented method as recited in claim 14, further comprising determining the set of adjustment parameters automatically and without requiring user input by querying a predetermined table of adjustment parameters with the number of frames included in the subset of frames.

19. The computer-implemented method as recited in claim 14, wherein the set of adjustment parameters includes a set of rules, defined based upon the number of frames included in the subset of frames used to generate the multi-frame image, for adjusting pixel values of the multi-frame image to alter a visual sharpness of the multi-frame image.

20. The computer-implemented method as recited in claim 14, wherein the set of adjustment parameters selected based on a first number of frames included in the subset of frames is different from a set of adjustment parameters selected based on a second number of frames included in the subset of frames.

* * * * *